United States Patent [19]

van der Lely

[11] Patent Number: 4,613,011
[45] Date of Patent: Sep. 23, 1986

[54] VEHICLE KING PIN AND DRIVE ASSEMBLY

[76] Inventor: Cornelis van der Lely, 7 Brüschenrain, Zug, Switzerland

[21] Appl. No.: 540,642

[22] Filed: Oct. 11, 1983

[30] Foreign Application Priority Data

Oct. 11, 1982 [NL] Netherlands .................. 8203923

[51] Int. Cl.[4] ............................................. B60K 17/30
[52] U.S. Cl. ......................................... 180/261; 180/262; 180/900; 384/420
[58] Field of Search .............. 180/261, 260, 253, 254, 180/262, 900; 384/420, 424, 427

[56] References Cited

U.S. PATENT DOCUMENTS

| | | | |
|---|---|---|---|
| 1,155,315 | 9/1915 | McGeorge | 180/261 |
| 1,840,407 | 1/1932 | Norman | 180/261 |
| 4,301,886 | 11/1981 | Kinoshita | 180/261 |
| 4,368,797 | 1/1983 | van der Lely | 180/900 |
| 4,385,846 | 5/1983 | Knauss | 384/420 |
| 4,413,918 | 11/1983 | Thomas | 384/420 |
| 4,442,914 | 4/1984 | Nishihara | 180/261 |

FOREIGN PATENT DOCUMENTS

| | | | |
|---|---|---|---|
| 1044485 | 11/1958 | Fed. Rep. of Germany | 180/262 |
| 65930 | 5/1979 | Japan | 180/261 |
| 124792 | 4/1949 | Sweden | 180/262 |
| 715365 | 2/1980 | U.S.S.R. | 180/262 |

*Primary Examiner*—John J. Love
*Assistant Examiner*—Everett G. Diederiks, Jr.
*Attorney, Agent, or Firm*—Penrose, Lucas, Albright, Pravel, Gambrell, Hewitt & Kimball

[57] ABSTRACT

A vehicle such as an agricultural tractor comprises drivable ground wheels, each front wheel steerable about its king pin's axis. A drive shaft assembly in each king pin comprises two parts axially relatively displaceable so that loads supported by the wheel are transmitted not through the drive shaft assembly but through its housing. The housing is supported on a thrust bearing for steering movement. The thrust bearing has a greater diameter than bearings which support the shaft assembly and comprises a disc surrounded, above and below, by two flat rings, one of which is a two-part ring. In one embodiment, bevel gears under the wheel shaft turn the wheel shaft and the king pin is inclined to the underlying surface and largely contained within the wheel's rim. In the other embodiment the king pin is substantially vertical and received between a pair of wheels, an axle for such wheel pair driven by meshed bevel gears, one on the axle and the other above the axle.

21 Claims, 5 Drawing Figures

VEHICLE KING PIN AND DRIVE ASSEMBLY

SUMMARY OF THE INVENTION

This invention relates to a vehicle, particularly, although not exclusively, an agricultural tractor.

Tractors comprising drivable and steerable front wheels frequently involve the problem that the drive members of these front wheels or their bearings are loaded by ground wheel forces to an extent such that the steerability of the ground wheels is adversely affected and increased wear occurs.

According to a first aspect of the present invention there is provided a vehicle comprising a ground wheel which is mounted on a king pin assembly for movement about a king pin axis, a shaft assembly of the king pin assembly comprising two parts which are movably connected to each other.

According to a second aspect of the present invention there is provided a vehicle comprising at least two ground wheels which are coupled with one another by king pins, a bearing of at least one of the king pins having a larger diameter than the outer periphery of a bearing in which a shaft assembly is journalled.

According to a third aspect of the present invention there is provided a vehicle comprising at least one ground wheel which is drivable by an engine of the vehicle and can be turned through about 130° about a king pin axis which is inclined to the vertical.

According to a fourth aspect of the present invention there is provided a ground wheel which is steerable about a king pin axis on a bearing which principally comprises a metal ring.

According to a fifth aspect of the present invention there is provided a vehicle comprising a shaft to which a driven and steerable ground wheel is coupled, the shaft comprising a power take-off shaft by which an implement coupled with the vehicle can be driven.

For a better understanding of the present invention and to show how it may be carried into effect, reference will now be made, by way of example, to the accompanying drawings, in which:

DESCRIPTION OF THE PREFERRED EMBODIMENTS

Figure 1:
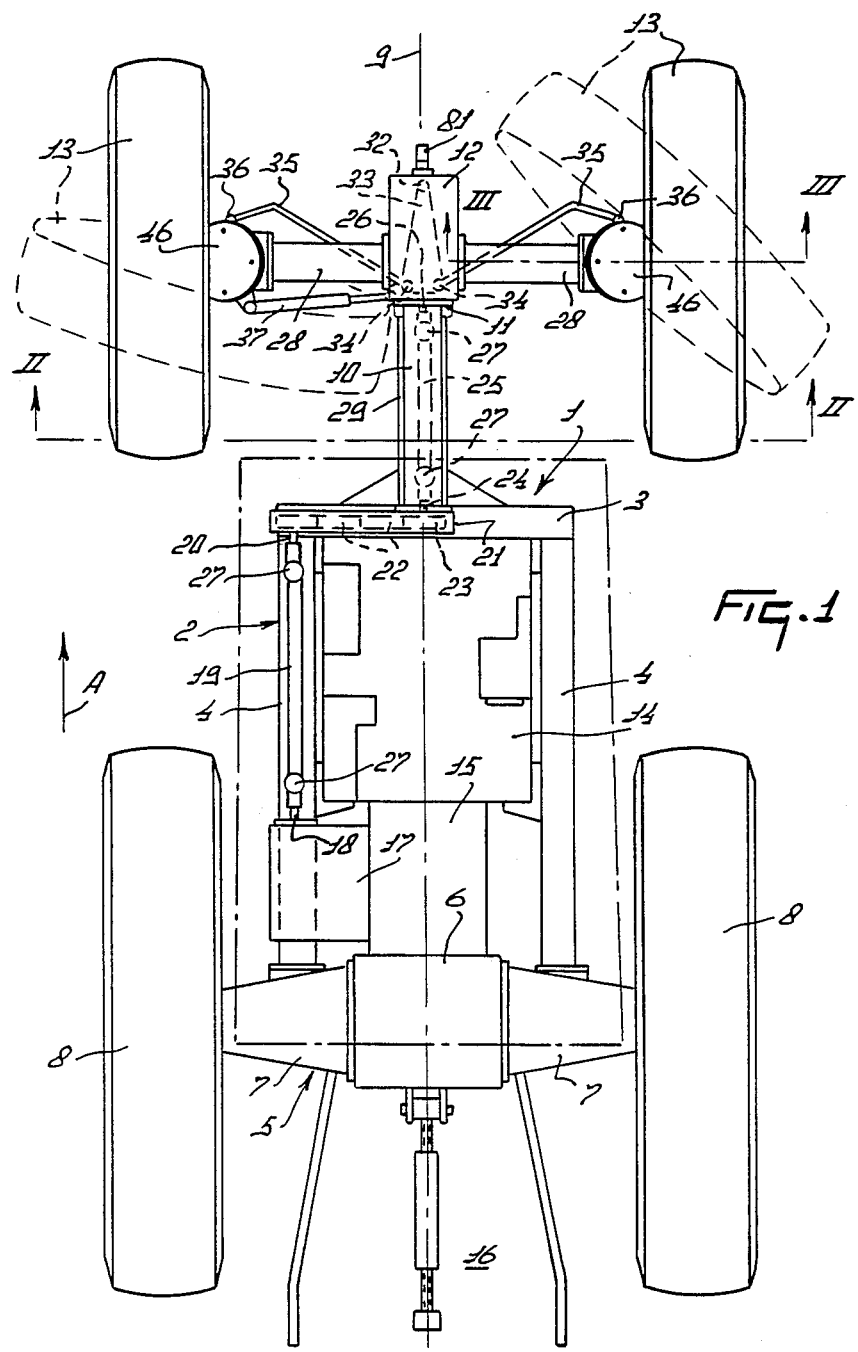
FIG. 1 is a plan view of a tractor.

In the plan view of FIG. 1, a tractor cab is represented by dot-and-dash lines but is otherwise omitted for the sake of clarity. The tractor comprises a frame 1 including a rear part 2 which is constructed in the form of a U in the illustrated embodiment. The frame part 2 comprises a horizontal, hollow beam 3 which extends transversely of the intended direction of travel of the tractor, as indicated by an arrow A. Two hollow frame beams 4 are secured to the beam 3 at its ends and are directed to the rear away from the beam 3. The rear ends of the beams 4 are rigidly secured to a rear axle assembly 5 of the tractor. The rear axle assembly 5 comprises a differential 6, to which are connected at each side axle carriers 7 which can comprise a bearing for a rear wheel 8 of the tractor. The whole rear axle 5 and the frame 1 are symmetrical with respect to a vertical longitudinal central plane of the tractor which extends in the direction A. A tubular beam 10 projects forwardly from the front of the beam 3. The front end of the beam 10 is rigidly secured to an end plate 11, which movably bears on a flat rear surface of a housing 12 comprising a gear wheel transmission and a differential for driving front wheels 13. The beam 10 and the end plate 11 are pivotable together, in a manner to be described more fully later in this description, with respect to the housing 12 and the front wheels 13.

As viewed on plan, the rectangular space defined by the frame part 2 and the rear axle assembly 5 accommodates a driving engine 14 and a change-speed mechanism 15 connected to the engine 14. The front of the engine 14 meets the rear of the beam 3 and the change-speed mechanism 15 contacts the rear of the engine 14 at the front and the front of the differential 6 at the rear. The change-speed mechanism 15 may be fully mechanical, but alternatively it may comprise a hydrostatic change-speed device. The frame part 2 extends forwardly approximately up to a vertical plane passing through the rear of the front wheels 13. To the rear of the rear axle assembly 5 is arranged a three-point lifting device 16 which can be actuated from the tractor cab. The rearwardly projecting output shaft of the engine 14 constitutes an input shaft of the change-speed mechanism 15, the housing of which is rigidly secured to the engine 14. On one side of the housing of the change-speed mechanism 15 is fastened a housing 17 containing a gear wheel mechanism which can be driven from an output shaft of the change-speed mechanism 15, the speed of rotation of this shaft being proportional to the speed of rotation of the driven rear wheels 8 and hence proportional to the travelling speed of the tractor. The gear wheel mechanism located in the housing 17 drives a forwardly projecting output shaft 18, which is continued in the forward direction by a shaft 19, the front end of which is connected to an input shaft 20 of a gear box 21 disposed on top of the beam 3 and mainly on the same side of the plane 9 as the mechanism in the housing 17. The shaft 19 is situated above the neighboring hollow beam 4. The gear box 21 extends generally laterally away from the input shaft 20 to a position a short distance beyond the plane 9 and comprises a plurality of interengaging gear wheels 22 arranged in a row and an end gear wheel 23, the rotary shaft of which comprises an output shaft 24 of the gear box 21 and projects horizontally and forwardly, being located in the plane 9. The forwardly projecting output shaft 24 of the gear box 21 is approximately coaxial with the beam 10, the rear end of which is rigidly secured to the housing of the gear box 21 and hence to the beam 3. The shaft 24 is continued in the forward direction by a shaft 25 located inside the beam 10 and linked to an input shaft 26 of the gear wheel transmission and a differential accommodated in the housing 12. The shaft 26 is journalled in the end plate 11 and in the housing 12, and has a center line which constitutes the pivotal axis about which the housing 12 and the front wheels 13 are pivotable together with respect to the beam 10 and the frame part 2. The end plate 11, which pivotally bears on the flat rear face of the housing 12, contributes to the transmission of the locally occuring bending moment in the frame (FIG. 2).

In the embodiment shown the shafts 19 and 25 through which drive is transmitted to the front wheels 13 are each provided with universal joints 27 (FIG. 1). This precaution is taken to allow for any elastic deformations of the frame 1 during operation, but is also useful when the frame beam 4 or the frame beam 10 or both slightly directed downwards towards the front away from their rear fastening areas, as a result of the diameter of the rear wheels 8 being larger than that of the front wheels 13. The latter design is, however, not necessary when tubular front wheel carriers 28, to be described later in this description, are rigidly secured to the two sides of the housing 12 and are disposed at a level below the region where the beam 10 is secured to the housing 12.

The housing 17 is supported by the adjacent frame beam 4, which passes beneath the housing 17 up to the neighboring axle carrier 7.

Figure 2:
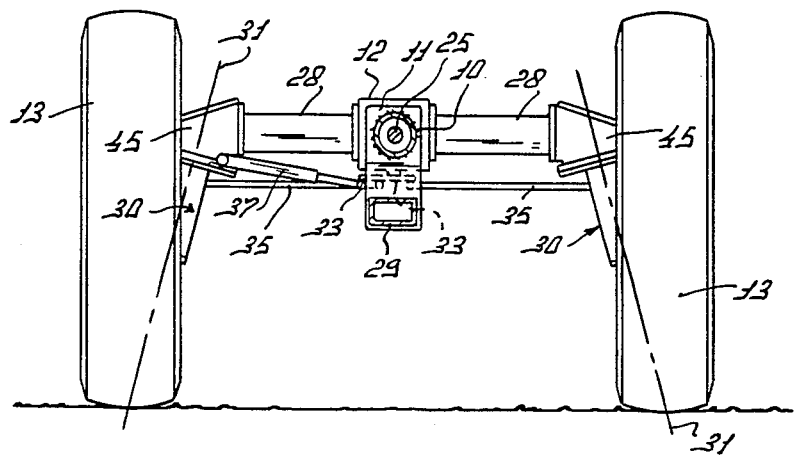
FIG. 2 is a view taken on the line II—II in FIG. 1.

As shown in FIG. 2, the end plate 11 of the beam 10 is extended downwardly and is rigidly secured at a position below the pipe 10 to a carrier 29 disposed below and parallel to the beam 10. The carrier 29 is rigidly secured at its rear end to the beam 3. The carrier 29 forms part of the frame 1.

King pins 30 are mounted at the two outer ends of the front wheel carriers 28 in a manner such that they are pivotable about axes 31 with respect to the respective front wheel carriers 28, for steering the front wheels 13. The axes 31 slope inwardly from bottom to top, as shown in FIG. 2. As shown in FIG. 2, each axis 31 is inclined at an angle of about 15° to the vertical. The axes 31 intersect each other at a point above the tractor and in the plane 9. The axes 31, which may be considered to be the center lines of the king pins 30, meet the ground surface at a point approximately on the line of action of the reaction force exerted by the ground on the respective front wheel 13.

Below the front of the housing 12 there is a pivotal shaft 32 (FIGS. 1 and 2), about which is pivotable a triangular, substantially horizontal steering plate 33 which extends rearwardly away from the pivotal shaft 32 and is disposed symmetrically with respect to the plane 9 in the straight-ahead position of the front wheels 13, as shown in the plane view of FIG. 1. The two hindmost corners of the triangular steering plate 33 are provided with pivotal shafts 34, about which the ends of track rods 35 are pivotable. The pivotal shafts 34 are constructed in the embodiment shown in FIGS. 2 and 3 in the form of ball-and-socket joints. The other ends of the steering rods 35 are connected by pivotal shafts or ball-and-socket joints 36 to levers (not shown in the Figures), which are fastened to the two king pins 30. As shown in the plan view of FIG. 1, the pivotal shaft 32 and the two ball-and-socket joints 36 are situated ahead of a vertical plane containing the center lines of the two front wheel carriers 28, whereas the ball-and-socket joints 34 are situated behind this plane. The track rods 35 intersect the plane.

At a position near one of the ball-and-socket joints 34, one end of a hydraulic ram 37 is pivotally connected to the steering plate 33. The other end of the ram 37 is pivotally connected to a mounting which is fixed with respect to one end of one of the front wheel carriers 28. The hydraulic ram 37 can be actuated from the tractor cab. Owing to the symmetrical structure of the steering mechanism described above, it is possible for the wheels to be turned about the axes 31 by the hydraulic ram 37 through an angle of about 65° or more to each side of the straight-ahead position shown in FIG. 1, so that a total limit-to limit turn of about 130° or more is possible. One fully limited position is indicated by broken lines in FIG. 1. As a result the tractor has a very small turning circle centered on an upwardly extending, imaginary axis located within the boundary of the tractor. In this way the tractor can turn through a bend of 90° or 180° or any other bend about this axis. This is important when drawing a plow or other soil cultivating implement or machine, since at the headland of the field a very narrow strip of land is sufficient for the tractor with the machine to turn.

Figure 3:
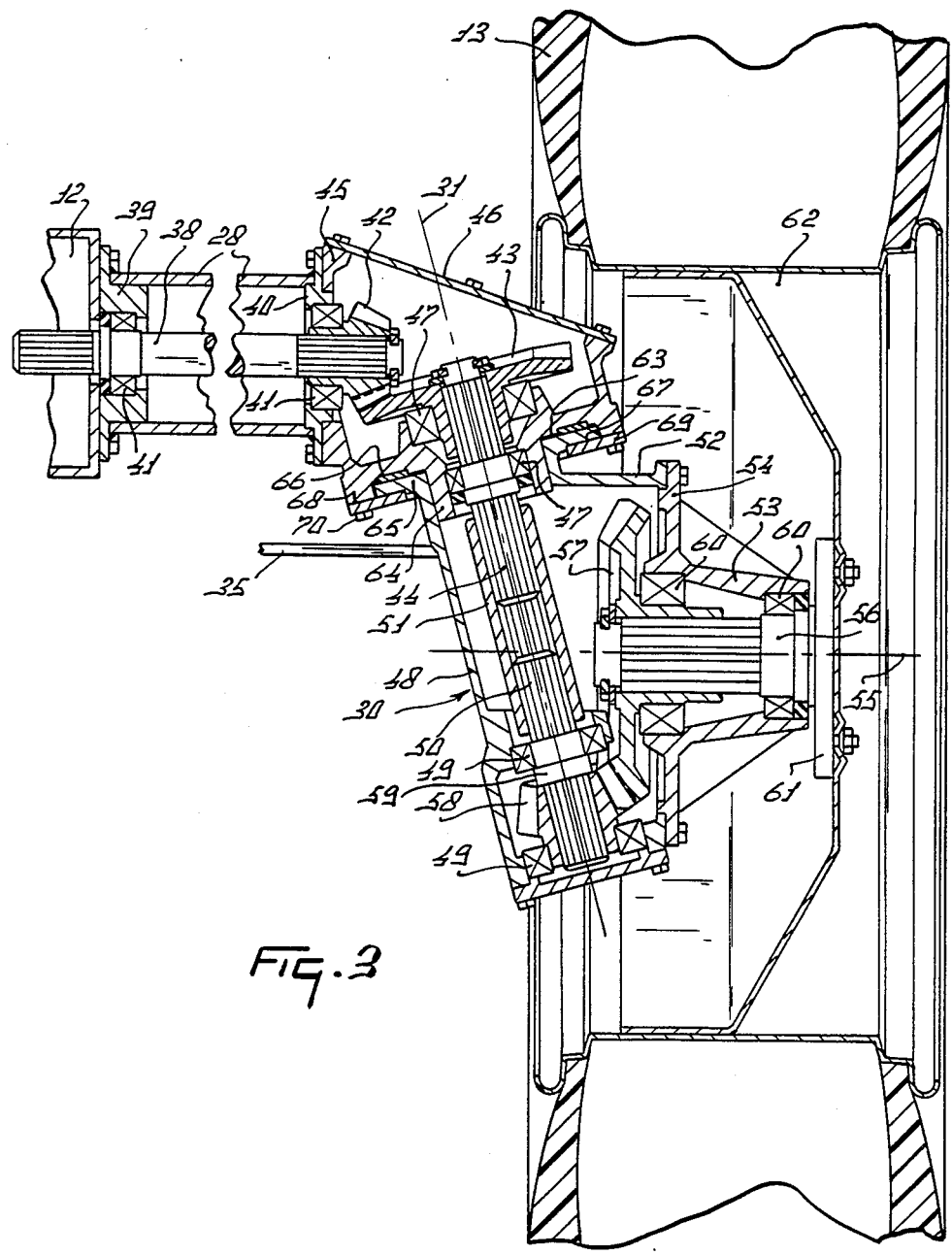
FIG. 3 is a view on an enlarged scale taken on the line III—III in FIG. 1.

As shown in FIG. 3, a drive shaft 38 on each side of the housing 12 is driven from the differential accommodated in the housing 12, the shaft being journalled in the respective front wheel carrier 28. For this purpose a bearing housing 39 is fastened to the side of housing 12 by bolts, a flange of the front wheel carrier 29 being welded to the bearing housing. A bearing housing 40 is provided in a similar fashion at the other end of the front wheel carrier 28, the housing 40 being integral with a flange welded to the carrier 28. The drive shaft 38 is journalled in bearings 41 arranged in the bearing housings 39 and 40. The shaft 38 is splined at both ends. A bevel gear wheel 42 is provided on the splines at the end of the shaft 38 near the bearing housing 40, this bevel gear wheel 42 meshing with a bevel gear wheel 43 mounted on a drive shaft 44 by means of splines covering substantially the whole length of the shaft 44. The gear wheels 42 and 43 are accommodated in a separate gear box 45, which is removably bolted to the flange of the bearing housing 40 and hence to the end of the substantially horizontal front wheel carrier 28 directed at right angles to the plane 9. The gear box 45 is closed at the top side by a detachable cover 46. The shaft 44 embodying the axis 31 projects downwards from the underside of the gear box 45 and is journalled in the housing of the gear box 45 in two axially spaced bearings 47. To the bottom of the gear box 45 is releasably fastened a swivelling gear box 48 which can pivot about the axis 31 with respect to the gear box 45 in a manner to be described more fully later in this description.

A drive shaft 50 is journalled in two spaced bearings 49 disposed near the lower end of the gear box 48 at a distance below the pair of bearings 47. The center line of the shaft 50 coincides with the axis 31 so that the shafts 44 and 50 are aligned with each other. The shaft 50 is also splined and has the same diameter as the shaft 44. The shafts 44 and 50 are connected to each other by a sleeve 51, which is situated inside the gear box 48 below the lower bearing 47 and above the upper bearing 49. The sleeve 51 has axial internal splines which engage the splines of the shafts 44 and 50 so that these shafts are relatively axially slidable but are nevertheless capable of transmitting torque. The housing of the gear box 48 has a boss 52 facing outwardly of the tractor and towards the front wheel 13. The boss 52 is substantially circular as viewed from the side and at its end away from the sleeve 51 it is closed by the housing of an axle carrier 53, which is provided at its end facing the gear box 48 with a circular flange 54, which is bolted to the end face of the boss 52. When the wheels 13 are in the straight-ahead position, the center line 55 of the axle carrier 53 is substantially horizontal and at right angles to the plane 9. A wheel axle 56 is coaxial with the center line 55 and is provided at its end projecting into the gear box 48 with a bevel gear wheel 57, which is in mesh with a bevel gear wheel 58 mounted on the splines on the lower end of the shaft 50. The gear wheel 58 is retained axially with respect to the shaft 50 between an inner race of the lower bearing 49 and a shoulder provided at the upper bearing 49 and directly below that bearing.

The wheel axle 56 is journalled in the housing of the axle carrier 53 in two spaced bearings 60, which are disposed on the outboard side of the gear wheel 57. The end of the wheel axle 56 protruding outwards out of the axle carrier 53 is provided with a flange 61, which, like the fixed flange 54 of the axle carrier 53, is at right angles to the center line 55. The flange 61 releasably receives a rim 62 of the ground wheel 13.

In view of the pivotable connection of the swivelling gear box 48 with the housing of the gear box 45, the underside of the housing of the gear box 45 has an annular recess 63, which is centered on the axis 31. The inner edge of the recess 63 adjoins a sleeve-like extension 64, the axis of which coincides with the axis 31 and in which the lower bearing 47 is supported. This recess 63 receives a flange 65 provided on the top end of the swivelling gear box 48 in a manner such that the flange fits between the cylindrical inner and outer walls of the recess 63. In the base of the annular recess 63 in the bottom end of the gear box 45 there is an annular cavity receiving an annular sliding bearing 66 in the form of a flat ring of hard metal. The bearing 66 is made from a single piece of metal. The lower face of the ring 66 bears on the top face of the flange 65 in a manner such that a small distance is maintained between that top face and the base of the recess 63 at right angles to the axis 31.

The underside of the flange 65 has an annular recess 67 which terminates at the periphery of the flange 65. When assembled in the steering mechanism, the thickness of the flange 65 at the recess 67, measured parallel to the axis 31, corresponds to the height of the outer cylindrical boundary of the recess 63 so that the underside 68 of the outer part of the gear box 45 and the face of the recess 67 are coplanar. At the underside 68 of the gear box 45 and on the face of the recess 67 of the flange 65 there is a ring 69, which is fastened by bolts 70 to the underside 68 of the gear box 45. So that it can be fitted, the ring 69 comprises two parts and it retains the flange 65, and hence the gear box 48 and the ring 66, in position on the gear box 45. The split ring 69 also constitutes a sliding rotary bearing and, like the ring 66, it may be provided on its surface facing the flange 65 with a lubricant.

The upwardly directed force exerted by the ground on the wheel 13 is transferred through the wheel axle 56, the bearings 60, the housing of the axle carrier 53 and the gear box 48 to the flange 65 and through the sliding bearings 66 and 69 so as to be supported by the housing of the gear box 45 and hence by the associated front wheel carrier 28 and the housing 12. The drive shafts 44, 50 are not subjected to the wheel force, since they are relatively slightly axially movable relatively to each other by means of the sleeve 41. This mutual movability permits simple assembly, since the relative distances between the two bearings 47, between the two bearings 49 and between, the bearings 47 and 49 need not satisfy severe tolerance requirements. Furthermore, the bearings 47 and 49 and the relative disposition of the gear wheels 42, 43 and 57, 58 are not affected by the force exerted by the ground on the wheel. Therefore, the drive shaft 44, 50, 51 has solely a driving function for the ground wheel 13.

The construction on the other side of the plane 9 is identical to the construction shown in FIG. 3.

The vertical dimension of the construction of the gear boxes 45 and 48 and that of the axle carrier 53 may be so small that the major part of the gear box 48, the entire axle carrier 53 and part of the gear box 45 are located inside the periphery of the rim 62.

Figure 4:
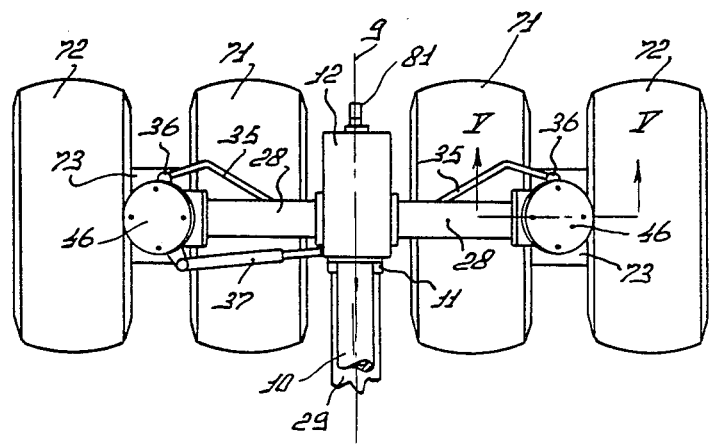
FIG. 4 is a partial plan view illustrating an alternative embodiment.
Figure 5:
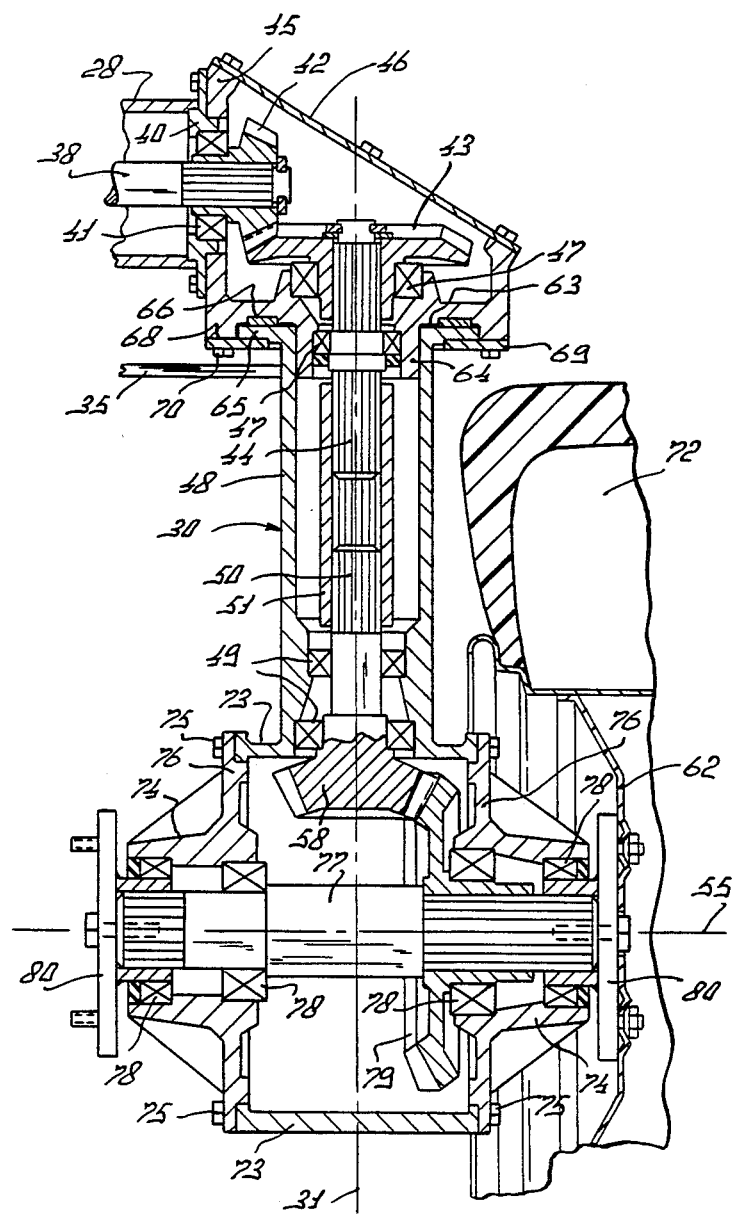
FIG. 5 is a sectional view taken on the line V—V in FIG. 4.

FIG. 4 schematically shows a front wheel construction which may also be used in the tractor shown in FIG. 1 instead of the above-described construction illustrated in FIGS. 2 and 3. The structural design of the arrangement of FIG. 4 with respect to the drive and the control of the front wheels is shown in FIG. 5. Parts shown in FIGS. 4 and 5 corresponding with similar parts shown in the preceding Figures are designated by the same reference numerals.

The construction shown in FIG. 5 is similar to that of FIG. 3, but the design has a somewhat different purpose, in that a double set of front wheels is arranged on the king pin 30 embodied by the housing of the gear box 48.

The term "king pin" as used herein means an upwardly extending member which supports a ground wheel in a manner such that the wheel can be turned about an upwardly extending king pin axis for steering purposes. The upwardly extending king pin axis may be an imaginary axis rather than the centerline of a king pin per se. In the embodiments described herein, the king pin axis coincides with the axis of the composite drive shaft 44, 50, 51.

As shown in FIG. 4, on each side of the plane 9 there are two front wheels 71 and 72, which are pivotable together by means of a king pin 30 (FIG. 5) with respect to the associated front wheel carrier 28 about the king pin axis 31. In this embodiment, the axis 31, as shown in the sectional view of FIG. 5, is at an angle of 90° o the center line of the drive shaft 38. Viewed in a direction at right angles to the plane 9, the axis 31 may be at an acute angle to the horizontal both in the preceding and the present embodiment, the axis 31 being forwardly inclined from top to bottom.

In the embodiment of FIG. 5, the underside of the housing of the gear box 48 is extended by a cylindrical housing part 73, which is coaxial with the center line 55 (i.e. the rotary axis of the front wheels). In the position shown in FIG. 5, the housing part 73 is symmetrical about the axis 31. To the two lateral end faces of the housing part 73 are releasably fastened axle carriers 74 by bolts 75. Each axle carrier 74, which has substantially the same structure as the axle carrier 53 of the preceding embodiment, projects away from the axis 31 from the housing part 73 and is fastened by means of a flange 76 to the periphery of the housing 73. The two axle carriers 74 support a wheel axle 77 which is journalled in the axle carriers 74 in two spaced bearings 78. The two axle carriers 74 are arranged symmetrically about the axis 31. A bevel gear wheel 79 is mounted on a splined end piece of the wheel axle 77, this gear wheel being in mesh with the bevel gear wheel 58. In contrast to the preceding embodiment, the bevel gear wheel 79 is disposed substantally wholly below the bevel gear wheel 58 so that in this embodiment the king pin 30 together with wheel axle drive 73, 74 is longer in a vertical direction than in the preceding embodimeht.

In the embodiment of FIG. 5 each axle carrier 74 is, as in the previous embodiment situated inside the periphery of the rim of the neighboring front wheels, but in contrast to the preceding embodiment the gear box 45 is disposed at a higher height above the ground than is the top of the front wheel 71 or 72 respectively. In this way the vertical central plane of each of the front wheels can be spaced apart from the axis 31 by a relatively short distance so that bending moments in the king pin 30 are largely avoided. The two end faces of the wheel axle 77 are again provided with releasable flanges 80. These flanges are provided with fastening means with the aid of which a rim of a front wheel can be releasably secured to the flange 80.

As shown in FIG. 1, a shaft 81 projects forwardly from the front of the housing 12 accommodating the gear wheel transmission and differential. The shaft 81 is branched from the drive train to the front wheels. The shaft 81 may be an extension of the input shaft 26 and is, therefore, driven at a speed of rotation proportional to the travel speed of the tractor. As an alternative, the shaft 81, which serves as a power take-off shaft for implements to be actuated, may be driven by the gear wheel system in the housing 12 so that the power take-off shaft 81 has a fixed-ratio speed reduction with respect to the input shaft 26. The housing 12 and the two front wheel carriers 28 are preferably provided with the fastening means of a front three-point lifting device (not shown). At the rear of the tractor a power take-off shaft (not shown) may project from the rear of the differential 6, the speed of rotation of which shaft is proportional to that of the engine 14 or to the travel speed.

During operation the engine 14 drives the rear wheels 8 through the torque converter 15 and the differential 6. The gear wheel system accommodated in the housing 17 and driving the output shaft 18 is drivably connected with the output of the torque converter 15 in a manner such that the output shaft 18 is driven at a speed proportional to the travel speed of the tractor. The output shaft 18 drives the gear wheel transmission and the differential in the housing 12 thorugh the shaft 19, the gear wheel system 22, 23 in the gear box 21, and the shafts 24 and 25. From there the two shafts 38 (in both the embodiments shown in FIGS. 3 and 5) are driven, these shafts projecting from each side of the housing 12 symmetrically about the plane 9. Each shaft 38 drives through the gear wheels 42, 43 the downwardly directed, relatively slidable shafts 44 and 50 and hence the gear wheel 58.

In the embodiment of FIG. 3 the gear wheel 58 is in mesh with the gear wheel 57 disposed substantially wholly above the gear wheel 58 and causing the outwardly directed wheel axle 56 and hence the front wheel 13 to rotate. The housing of the axle carrier 53, holding the gear wheel 57, occupies substantially the entire height of the king pin 30. The vertical dimension of the king pin 30 is determined mainly by the diameter of the gear wheel 57, the latter being dependent, in turn, on the transmission ratio between the gear wheels 57 and 58. Since the transmission ratios bring about a speed reduction of the wheel axle 56 relative to the shaft 50, a relatively large speed reduction provided in the housing 12 means that a relatively smaller gear wheel 57 is required so that the overall height of the whole king pin construction is smaller when the gear wheel 57 extends along and to one side of the drive shafts 44 and 50 as is shown in FIG. 3. Owing to the reduced speed of the shafts 38 it is thus possible, for a given wheel diameter, for the tractor frame to be disposed at a smaller height above the ground so that the center of gravity of the tractor will be lower. The construction shown in FIG. 3 may, of course, also be employed at the rear wheels with or without the swivel construction for steerable wheels.

When two drivable and steerable front wheels are desired on each side of the plane 9 as in the embodiment of FIG. 5, in which case the front wheel carrier 28 has to extend above the inner front wheels 71, the diameter of the gear wheel 79 can be reduced by providing a relatively large speed reduction in the housing 12 so that the diameter of the housing part 73 may be smaller and the ground clearance of the bottom of the drive assembly is greater.

As stated above the forces exerted by the front wheels on the ground are transferred solely through the housings of the axle carriers 53 and 74 respectively and of the the gear box 48 (affording the king pin) to the gear box 45 without placing the drive trains and the bearings under load. When the front wheels are steered by means of the hydraulic ram 37 (FIGS. 1, 2 and 4), the front wheels turn about the king pin axes 3 owing to the movements of the steering plate 33 about the pivotal shaft 32 via the steering rods 35. Then the housing of the gear box 48 and hence the flange 65 turns between the hard metal rings or discs 66 and 69, the diameter of which exceeds the outer circumference of the bearings 47 so that, viewed with respect to the axis 31, a radially large supporting surface is formed, which reduces the pressure load on the swivel shaft bearings or, respectively, the force of the bearing may be chosen to be relatively high. Bending of the king pin 30 is kept relatively small because the king pin axis 31 intersects the line of action of the force exerted by the ground on the wheel in practically all positions of the front wheel (in the embodiment shown in FIG. 3). This bending load in the embodiment of FIG. 4, where the same swivel bearing is used is also very slight because the front wheels are arranged symmetrically on each side of the king pin axis 31.

The construction according to the invention provides a king pin construction which is of light weight and is sufficiently strong even under difficult operational conditions.

Although various features of the vehicles described and illustrated will be set forth in the following claims as inventive features, the invention is not necessarily limited to these features and may encompass all inventively novel features disclosed both individually and in various combinations.

I claim:

1. A vehicle comprising at least one ground wheel which is mounted on a king pin assembly for movement about a king pin axis, said king pin assembly comprising weight bearing housing means which is supported from axle means of said wheel, said wheel being on the outboard side of said housing means, said housing means providing the sole and direct support from said wheel for the vehicle, a drive shaft assembly in said housing means which drivably interconnects an engine of the vehicle to said axle means, said drive shaft assembly comprising two aligned drive shafts, and connection means between said drive shafts which is so constructed and arranged to transmit rotary motion only from one of said drive shafts to the other without significantly restricting relative axial motion between them or contributing to the vehicle's support.

2. A vehicle as claimed in claim 1, in which said ground wheel is one of at least two ground wheels which are coupled with one another by said shaft assembly, a bearing of said shaft assembly having a larger diameter than the outer circumference of a bearing in which said shaft assembly is journaled.

3. A vehicle as claimed in claim 1, in which said ground wheel comprises a front wheel.

4. A vehicle as claimed in claim 1, in which said two parts of said shaft assembly are connected together by a hollow element having axial splines in which at least one of said parts is slidable.

5. A vehicle as claimed in claim 4, in which said shaft assembly comprises an upper bevel gear.

6. A vehicle as claimed in claim 5, comprising a bearing of said shaft assembly supported in a bearing housing in said housing means which supports a swivel bearing of said king pin assembly.

7. A vehicle as claimed in claim 6, in which said ground wheel as a whole is pivotable and steerable about said king pin assembly's axis by means of said swivel bearing.

8. A vehicle as claimed in claim 7, in which said bearing housing extends inside said swivel bearing.

9. A vehicle as claimed in claim 8, in which said swivel bearing comprises a bearing ring.

10. A vehicle as claimed in claim 9, in which said bearing ring is a metal ring.

11. A vehicle as claimed in claim 6, in which said upper bevel gear is in mesh with a further bevel gear.

12. A vehicle as claimed in claim 11, in which the axes of said bevel gears are inclined about 75° relative to each other.

13. A vehicle as claimed in claim 12, wherein said housing means comprises a housing in which said bevel gears are accommodated, said housing disposed at least in part inside the outer periphery of the rim of said ground wheel.

14. A vehicle comprising an engine and at least one ground wheel which includes a rim, a king pin assembly moving said wheel, said king pin assembly containing a shaft assembly including upwardly extending shaft means connecting said engine to said wheel for driving same, said king pin assembly and said wheel turnable together through about 130° about said king pin's axis, said axis being inclined to the vertical, said king pin assembly comprising weight bearing housing means providing the sole support by said one ground wheel for the vehicle, the upper aspect of said housing means being at least in part surrounded by said rim of said ground wheel, said housing means comprising flange means surrounding said upwardly extending shaft means, said flange means having two parallel planar surfaces located on different sides of said flange means, each of said surfaces in bearing contact with a corresponding ring-shaped hard metal bearing plate in said housing means so that a part of said housing means including said flange means is rotatable relative to a further part of said housing means including said bearing plates.

15. A vehicle as claimed in claim 14, in which said king pin assembly's axis intersects the ground surface approximately centrally below said ground wheel.

16. A vehicle as claimed in claim 15, in which one said part of said housing means comprises a gear box which contains in part said shaft assembly, said gear box being disposed at least in part within said rim of said ground wheel.

17. A vehicle as claimed in claim 16, in which said gear box is located substantially completely within and surrounded by said rim.

18. A vehicle as claimed in claim 17, in which said upwardly extending shaft means has a rotary axis coinciding with the axis of rotation said housing means parts, said upwardly extending shaft means having said axis being divided.

19. A vehicle as claimed in claim 18 wherein said ground wheel is steerable about said upwardly extending shaft mean's said axis.

20. A vehicle as claimed in claim 19, in which each said housing means part comprises a gear box.

21. A vehicle as claimed in claim 19, in which said shaft assembly comprises a power take-off shaft by means of which an implement coupled with the vehicle is drivable.

* * * * *